(12) United States Patent
Kang et al.

(10) Patent No.: US 9,823,508 B2
(45) Date of Patent: Nov. 21, 2017

(54) DISPLAY DEVICE

(71) Applicant: SAMSUNG DISPLAY CO., LTD., Yongin-si, Gyeonggi-do (KR)

(72) Inventors: Eui Jeong Kang, Suwon-si (KR); Myung Seok Kwon, Seongnam-si (KR); So Jeong Na, Suwon-si (KR); Young Min Park, Hwaseong-si (KR); Jung Hyun Yang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 125 days.

(21) Appl. No.: 14/642,673

(22) Filed: Mar. 9, 2015

(65) Prior Publication Data

US 2016/0057850 A1 Feb. 25, 2016

(30) Foreign Application Priority Data

Aug. 19, 2014 (KR) .................. 10-2014-0107586

(51) Int. Cl.
*G02F 1/1333* (2006.01)
*G02F 1/1335* (2006.01)

(52) U.S. Cl.
CPC .. *G02F 1/133608* (2013.01); *G02F 1/133308* (2013.01); *G02F 1/133605* (2013.01); *G02F 1/133603* (2013.01)

(58) Field of Classification Search
CPC .... H05K 1/028; H05K 5/0004; H05K 9/0096; G02F 1/133608; G02F 1/133605; G02F 1/133308; G02F 2001/133314; G02F 2001/133322; G02F 2001/133334; G02F 1/2001; G02F 1/133314; G02F 1/133322; G02F 1/133334; G09F 9/35

USPC ........................................................ 349/58
See application file for complete search history.

(56) References Cited

U.S. PATENT DOCUMENTS

| 7,665,859 B2 * | 2/2010 | Lim .................. G02F 1/133603 349/67 |
| 2007/0002554 A1 | 1/2007 | Lim |
| 2012/0236204 A1 * | 9/2012 | Kasai ................ G02F 1/133603 348/553 |
| 2013/0044460 A1 * | 2/2013 | Jang .................. G02F 1/133615 362/97.1 |
| 2013/0321740 A1 * | 12/2013 | An ....................... H05K 5/0217 349/58 |
| 2014/0009914 A1 | 1/2014 | Cho et al. |
| 2014/0078720 A1 | 3/2014 | An et al. |
| 2015/0219324 A1 * | 8/2015 | Kim .................. G02F 1/133305 349/58 |

FOREIGN PATENT DOCUMENTS

| KR | 10-2007-0002144 | 1/2007 |
| KR | 10-2007-0040012 | 4/2007 |
| KR | 10-2014-0007202 | 1/2014 |

\* cited by examiner

*Primary Examiner* — Steven T Sawyer
(74) *Attorney, Agent, or Firm* — Lewis Roca Rothgerber Christie LLP

(57) ABSTRACT

A display device including a bottom chassis including a bent portion, a light module including a light source on the bent portion, a curved surface display panel on the bottom chassis and on the light module, and a reflector between the curved surface display panel and the bottom chassis, wherein a height between end portions of the bent portion and bottom chassis is greater than a height between central portions of the bent portion and bottom chassis.

17 Claims, 13 Drawing Sheets

DISPLAY DEVICE

CROSS-REFERENCE TO RELATED APPLICATION

This application claims priority to and the benefit of Korean Patent Application No. 10-2014-0107586, filed on Aug. 19, 2014, the content of which is incorporated herein in its entirety by reference.

BACKGROUND

1. Field

Aspects of one or more embodiments of the present invention relate to a display device with improved luminance.

2. Description of Related Art

A liquid crystal display ("LCD") is a type of flat panel display ("FPD"), which is most widely used as a display device. The LCD includes two substrates on which an electric field generating electrodes, such as a pixel electrode and a common electrode, is located, and a liquid crystal layer interposed between the two substrates. In the LCD, a voltage is applied to the electric field generating electrode so that liquid crystal molecules of the liquid crystal layer are rearranged, thereby adjusting the amount of transmitted light.

A display device, such as LCDs, includes a backlight unit. The backlight unit is classified into three types (kinds): a direct type (or a direct kind), an edge type (or an edge kind), and a corner type (or a corner kind), based on positions of the light source.

A set of substantially low-power high-efficiency light-emitting elements, such as light-emitting diodes ("LEDs") are used as a light source in a backlight unit. However, the LEDs generate, disadvantageously, a large amount of heat.

Accordingly, there have been demands for a display device that has a sufficient luminance utilizing only a small number of LEDs.

It is to be understood that this background of the technology section is intended to provide useful background information for understanding the here-disclosed technology and, as such, the technology background section may include ideas, concepts or recognitions that were not part of what was known or appreciated by those skilled in the pertinent art prior to corresponding effective filing dates of subject matter disclosed herein.

SUMMARY

Aspects of one or more exemplary embodiments of the present invention are directed toward a display device that is configured to achieve the desired qualities of having sufficient luminance utilizing only a small number of LEDs, having improved (e.g., increased) heat dissipation and a high level of hardness.

According to an exemplary embodiment of the present invention, there is provided a display device including: a bottom chassis including a bent portion; a light module including a light source on the bent portion; a curved surface display panel on the bottom chassis and on the light module; and a reflector between the curved surface display panel and the bottom chassis, wherein a height between end portions of the bent portion and bottom chassis is greater than a height between central portions of the bent portion and bottom chassis.

In an embodiment, the reflector and the bottom chassis are spaced from each other in a central portion of the curved surface display panel.

In an embodiment, the bottom chassis includes: a bottom part on which the light module is located; and a side part on an edge portion of the bottom part.

In an embodiment, the light module is located on an edge portion of the bottom part.

In an embodiment, the bottom part forms an obtuse angle with the side part.

In an embodiment, the light module includes: a printed circuit board between the bottom chassis and the reflector, the printed circuit board corresponding to an edge portion of the bottom part; and a light source electrically coupled to the printed circuit board, the light source being at least partially exposed above the reflector through an opening penetrating the reflector.

In an embodiment, the display device further includes a light diffusion unit configured to diffuse light from the light source.

In an embodiment, the light diffusion unit includes: a lens on the light source; and a lens support configured to support the lens.

In an embodiment, the lens support is between the lens and the printed circuit board.

In an embodiment, the light module includes: an auxiliary printed circuit board between the bottom chassis and the reflector, the auxiliary printed circuit board being electrically coupled to the printed circuit board; and an auxiliary light source electrically coupled to the auxiliary printed circuit board, the auxiliary light source being at least partially exposed above the reflector through the auxiliary opening penetrating the reflector.

In an embodiment, the reflector includes: an inner reflection part on the bottom part; and an outer reflection part on the side part.

In an embodiment, an angle between the inner reflection part and the outer reflection part is smaller than the angle between the bottom part and the side part.

In an embodiment, the inner reflection part includes an inclined surface having a shape of being gradually lower from a central portion of the inner reflection part.

In an embodiment, the outer reflection part has a same length as the inclined surface.

In an embodiment, the reflector includes: an inner reflection part on a central portion of the bottom part; an outer reflection part on the side part; and a flat reflection part on the bottom part, the flat reflection part being surrounded by the inner and outer reflection parts.

In an embodiment, the light module includes: a printed circuit board between the bottom chassis and the reflector, the printed circuit board corresponding to the flat reflection part; and a light source electrically coupled to the printed circuit board, the light source being at least partially exposed above the reflector through an opening penetrating the reflector.

In an embodiment, the display device further includes a flat lens between the reflector and the curved surface display panel.

In an embodiment, the display device further includes a support between the bottom part and the light module.

In an embodiment, a plurality of supports have different heights from each other.

In an embodiment, the support and the bottom part are integrally formed and the support is hollow.

According to exemplary embodiments of the present invention, a display device has the following effects.

According to one or more exemplary embodiment of the present invention, a reflector has an inclined shape at a central portion thereof. Therefore, sufficient luminance may be achieved using (or utilizing) only a small number of light sources.

According to one or more exemplary embodiment of the present invention, a bottom chassis includes a plurality of supports that are empty (e.g. hollow) inside. Due to the structure of the supports, the bottom chassis may have a large contact area with external air, thereby improving (e.g., increasing) heat dissipation performances.

According to one or more exemplary embodiment of the present invention, a support is integrated with a bottom chassis. Therefore, the bottom chassis may have a high level of hardness.

The foregoing summary is only illustrative and is not intended to, in any way, limit the claims of the present invention. In addition to the illustrative embodiments and features described above, further embodiments and features will become apparent by reference to the drawings and the following detailed description.

BRIEF DESCRIPTION OF THE DRAWINGS

The above and other features of the present invention will be more clearly understood from the following detailed description taken in conjunction with the accompanying drawings, in which.

DETAILED DESCRIPTION

Figure 1:
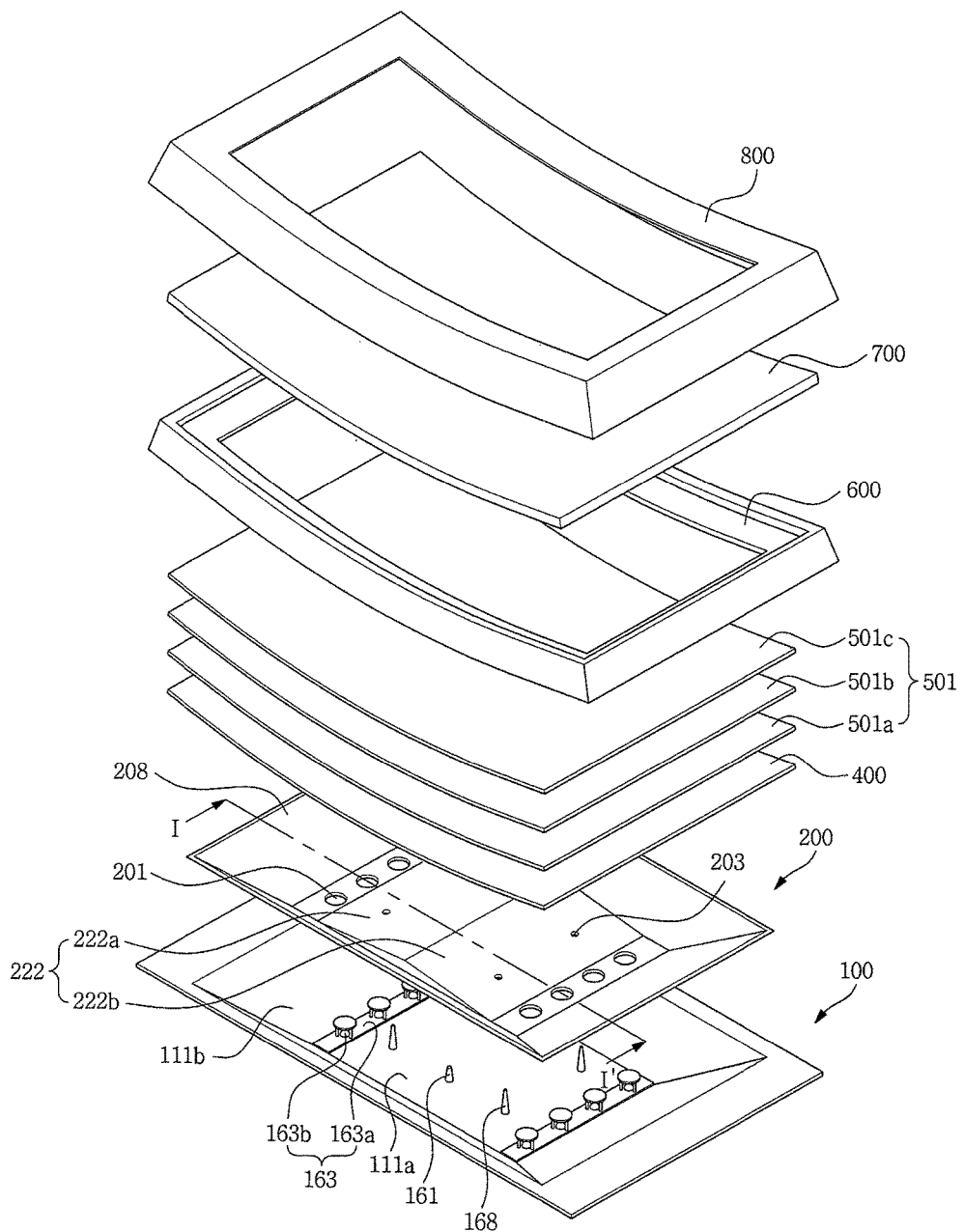
FIG. 1 is an exploded perspective view illustrating an exemplary embodiment of a display device according to the present invention.

Aspects and features of the present invention and methods for achieving the same will be made clear from exemplary embodiments described below in more detail with reference to the accompanying drawings. The present invention may, however, be embodied in many different forms and should not be construed as being limited to the exemplary embodiments set forth herein. Rather, these exemplary embodiments are provided so that this disclosure will be thorough and complete, and will fully convey the scope of the present invention to those skilled in the art. The present invention is merely defined by the scope of the claims. Therefore, well-known constituent elements, operations and techniques are not described in more detail in the exemplary embodiments in order to prevent the present invention from being obscurely interpreted. Like reference numerals refer to like elements throughout the specification.

In the drawings, the thickness of layers, regions, etc. are exaggerated for clarity. It will be understood that when a first part such as a layer, a film, a region, or a plate is on a second part, the second part may be not only directly on the first part but a third part may intervene between them. Further, a first part such as a layer, a film, a region, or a plate is under a second part, the second part may be not only directly under the first part but a third part may intervene between them.

The spatially relative terms "lower," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "lower" than another device may be placed "upper" to the other device. Accordingly, the illustrative term "lower" may include both the lower and upper positions. The device may also be oriented in the other direction, and thus the spatially relative terms may be interpreted differently depending on the orientations.

In the specification, when a first element is referred to as being "coupled to" or "connected to" a second element, the first element may be directly connected to the second element or indirectly connected to the second element with one or more intervening elements interposed therebetween. The terms "comprises," "comprising," "includes," and/or "including," when used in this specification, may specify the presence of stated features, integers, steps, operations, elements, and/or components, but do not preclude the presence or addition of one or more other features, integers, steps, operations, elements, and/or components.

Although the terms "first," "second," and "third" and the like may be used herein to describe various elements, these elements should not be limited by these terms. These terms may be used to distinguish one element from another element. Thus, "a first element" could be termed "a second element" or "a third element," and "a second element" and "a third element" can be termed likewise without departing from the teachings herein. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

As used herein, the singular forms "a", "an" and "the" are intended to include the plural forms as well, unless the context clearly indicates otherwise.

As used herein, the term "substantially," "about," and similar terms are used as terms of approximation and not as terms of degree, and are intended to account for the inherent deviations in measured or calculated values that would be recognized by those of ordinary skill in the art.

Unless otherwise defined, all terms used herein (including technical and scientific terms) have the same meaning as commonly understood by those skilled in the art to which this present invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
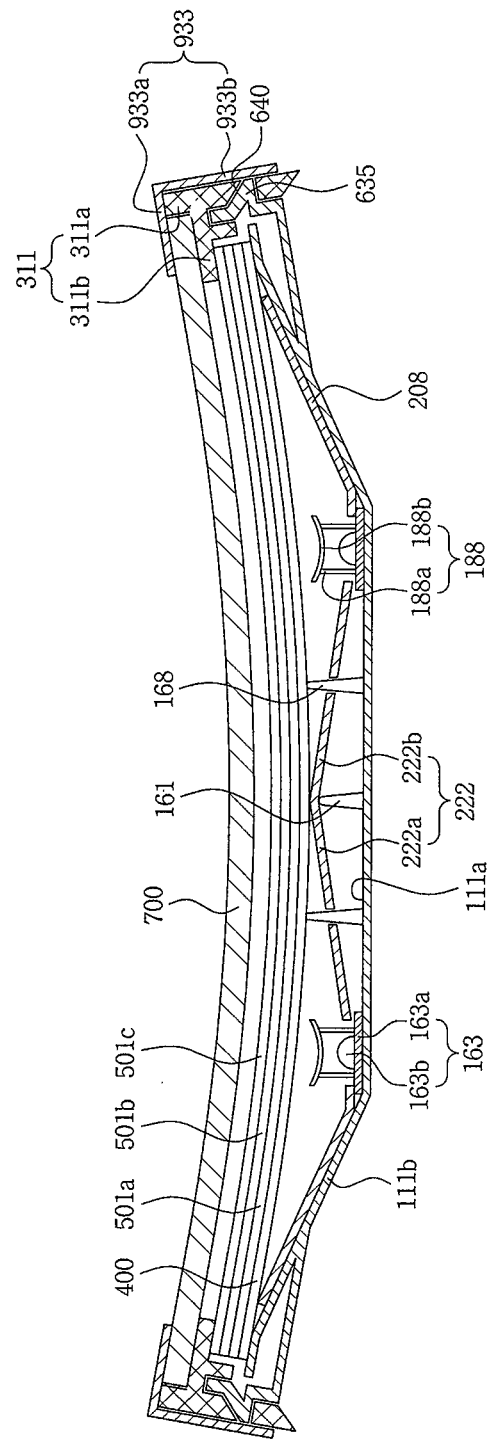
FIG. 2 is a cross-sectional view taken along line I-I' of FIG. 1.
Figure 3:
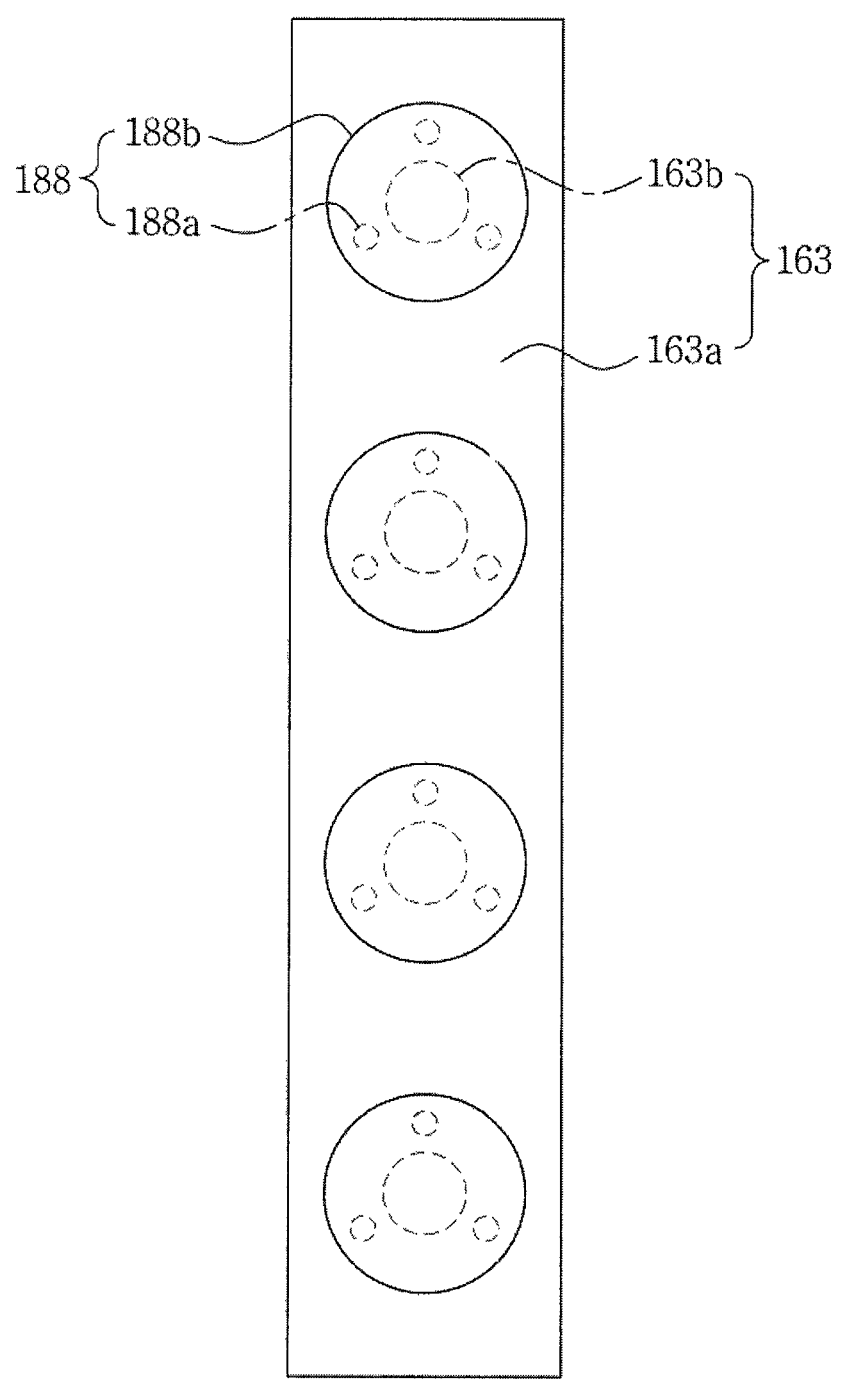
FIG. 3 is a diagram illustrating a light diffusion unit illustrated in FIG. 2, as viewed from a different angle.

FIG. 1 is an exploded perspective view illustrating an exemplary embodiment of a display device according to the present invention. FIG. 2 is a cross-sectional view taken along line I-I' of FIG. 1. FIG. 3 is a diagram illustrating a light diffusion unit illustrated in FIG. 2, as viewed from a different angle.

According to one or more exemplary embodiment, a display device is a curved display device of which a surface is curved in a partial-circle profile extending from a central portion of a display area to opposing sides thereof. Unless otherwise explained, all components set forth herein may include a bendable (e.g., deformable) material.

The display device may include a bottom chassis 100, a light module 163, a reflector 200, a diffuser 400, an optical sheet 501, a mold frame 600, a display panel 700, and a top chassis 800 as illustrated in FIGS. 1 and 2. Among the above enumerated components, the diffuser 400, the optical sheet 501, the mold frame 600, the display panel 700, and the top chassis 800 may be curved in a shape or profile to fit the overall curved surface of the display device.

The bottom chassis 100 may include an accommodating space therein. The light module 163 supports 161 and 168, and the reflector 200 may be located in the accommodating space. In order to define the accommodating space, the bottom chassis 100 may include a base portion 111a and a plurality of side portions 111b. In an exemplary embodiment, the base portion 111a may have a quadrangular shape in the top plan view and each of the plurality of side portions 111b may extend (or protrude) from respective edge portions of the base portion 111a to a height (e.g., a predetermined height) in the thickness direction. Edge (or end) portions of adjacent side portions 111b may be coupled to each other. A space surrounded by the side portions 111b and the base portion 111a may define the accommodating space of the bottom chassis 100.

As illustrated in FIG. 1, the side portions 111b may be divided into the following groups: a pair of short side portions and a pair of long side portions. The pair of short side portions of the plurality of side portions 111b may be relatively short in length and may refer to two side portions that oppose (e.g., face) each other. The pair of long side portions of the plurality of side portions 111b may be relatively long in length and may refer to two side portions that oppose (e.g., face) each other.

A locking projection 635 may be located on an outside of a pair of side portions 111b that oppose (e.g., face) each other with respect to the base portion 111a. For example, as illustrated in FIG. 2, the locking projection 635 may be located on each of the pair of long side portions. The mold frame 600 may be fixed to the bottom chassis 100 by the locking projection 635. The locking projection 635 may be defined by a bent portion of the corresponding side portion 111b, which protrudes outwardly toward the mold frame 600.

The light modules 163 may be configured to produce light. The light modules 163 may be located on the base portion 111a of the bottom chassis 100. In an exemplary embodiment, as illustrated in FIG. 1, two light modules 163 may be respectively located on any two of edge portions of the base portion 111a. In more detail, the light modules 163 may be located on each edge portion of the base portion 111a on which two short side portions that oppose (e.g., face) each other are located.

As illustrated in FIG. 2, each light module 163 may include a printed circuit board ("PCB") 163a and at least one light source 163b.

The PCB 163a may be located on the base portion 111a. In more detail, the PCB 163a may be located between the bottom chassis 100 and the reflector 200 to correspond to an edge portion of the base portion 111a. The PCB 801a may be partitioned into at least one mounting area and a conductive line area. Where the light module 163 includes at least two light sources 163b, the mounting area may be provided in plural such that one light source 163b is located in each mounting area, and a plurality of conductive lines may be located in the conductive line area so as to transmit drive power to the light sources 163b. A power for driving the light sources 163b may be generated in an external power supply unit and may be then supplied to the plurality of conductive lines through a separate connector.

The light source 163b may be configured to emit light outwards therefrom and may be located on the PCB 163a. The light source 163b may be electrically coupled to (e.g., electrically connected to) the conductive lines of the PCB 163a. The light source 163b may be at least partially exposed above the reflector 200 through an opening (e.g., a through-hole) 201 that penetrates the reflector 200.

When the light source 163b is provided in plural, a plurality of light sources 163b mounted on at least one PCB 163a may be aligned with each other along a longitudinal direction of any one side portion. For instance, as illustrated in FIG. 1, a plurality of light sources 163b may be aligned with each other along a longitudinal direction of a short side portion.

The distances between the plurality of light sources 163b mounted on at least one PCB 163a may all be the same or may be different from each other. Some of the light sources 163b located on one PCB 163a may be spaced the same distance from each other, and the other light sources 163b may be spaced at different distances from each other.

The number of light sources 163b located on each PCB 163a may be consistent with (e.g., same as) each other or may be different from each other. In an exemplary embodiment, the number of light sources 163b located on any one PCB 163a of two PCBs 163a illustrated in FIG. 1 may be greater than the number of light sources 163b located on the other PCB 163a of the two PCBs 163a.

When the number of light sources 163b on each PCB 163a is the same, the light sources 163b, which are located on the different PCBs 163a and correspond to each other, may be located parallel to a length direction of a long side portion.

The light source 163b may be an emission package that includes at least one light emitting diode ("LED"). In an exemplary embodiment, for instance, one emission package may include a red LED generating and emitting red light, a green LED generating and emitting green light, and a blue LED generating and emitting blue light. The emission package may produce white light by combining (or mixing) three colors. In another exemplary embodiment, the emission package may include only the blue LED among the LEDs of the three colors and a phosphor may be located in a light emitting unit of the blue LED so as to convert the generated blue light to white light.

Light emitted from the light source 163b may be diffused by a light diffusion unit 188. The light diffusion unit 188 may include a lens 188b and at least one lens support 188a, as illustrated in FIGS. 2 and 3.

The lens 188b may be located on the light source 163b. The lens 188b may be a concave lens.

The at least one lens support 188a may be located between the lens 188b and the PCB 163a.

The lens support 188a may be attached to the lens 188b at one side thereof and may be attached to the PCB 163a at the opposite side thereof. In this case, the one side of the lens support 188a may be coupled to the lens 188b by an adhesive member. Similarly, the opposite side of the lens support 188a may be coupled to the PCB 163a by the adhesive member. In another exemplary embodiment, the opposite side of the lens support 188a may be attached to the base portion 111a, not the PCB 163a.

As illustrated in FIG. 3, three lens supports 188a may be provided. The three lens supports 188a may be located in a triangular shape around the light source 163b.

The lens support 188a may include a transparent material.

The reflector 200 may be located between the bottom chassis 100 and the display panel 700. In more detail, the reflector 200 may be located between the bottom chassis 100 and the diffuser 400.

The reflector 200 and the display panel 700 may protrude toward each other. More specifically, the reflector 200 and the display panel 700 may protrude toward each other at their respective central portions.

The reflector 200 may reflect light emitted from the light source 163b to the display panel 700.

The reflector 200 may include an inner reflection part 222 and an outer reflection part 208.

The inner reflection part 222 may be located on the base portion 111a. The inner reflection part 222 may sharply rise toward the display panel 700 at a central portion thereof. At least one central support 161 may be located under the central portion of the inner reflection part 222 so as to support the inner reflection part 222.

The inner reflection part 222 may include two inclined surfaces 222a and 222b. That is, the two inclined surfaces 222a and 222b may include a first reflection part 222a between a central portion of the base portion 111a and one side portion 111b, and also include a second reflection part 222b between the central portion of the base portion 111a and another side portion 111b. In this case, the one and another side portions 111b may refer to two side portions that oppose each other (e.g., form an angle with one another).

The first and second reflection parts 222a and 222b may be inclined surfaces that gradually extend from the central portion of the inner reflection part 222 toward the lower corresponding side portion. That is, the first and second reflection parts 222a and 222b may be inclined at an angle (e.g., a predetermined angle) with respect to the base portion 111a. The base portion 111a may form an acute angle with the first reflection part 222a and may also form an acute angle with the second reflection part 222b.

The outer reflection part 208 may be located on the side portions 111b. In more detail, the outer reflection part 208 may be located on an interior surface of each side portion 111b. In this case, the interior surface of the side portion 111b may be one that faces a surface of another side portion 111b, among a plurality of surfaces of the side portion 111b. Interior surfaces of each side portion 111b may be inclined at an angle (e.g., a predetermined angle) with respect to the base portion 111a. The base portion 111a may form an obtuse angle with each side portion 111b.

The outer reflection part 208 and the interior surface of the side portion 111b may be bonded to each other via (e.g., utilizing) an adhesive member, such as a double-sided tape.

Figure 4A:
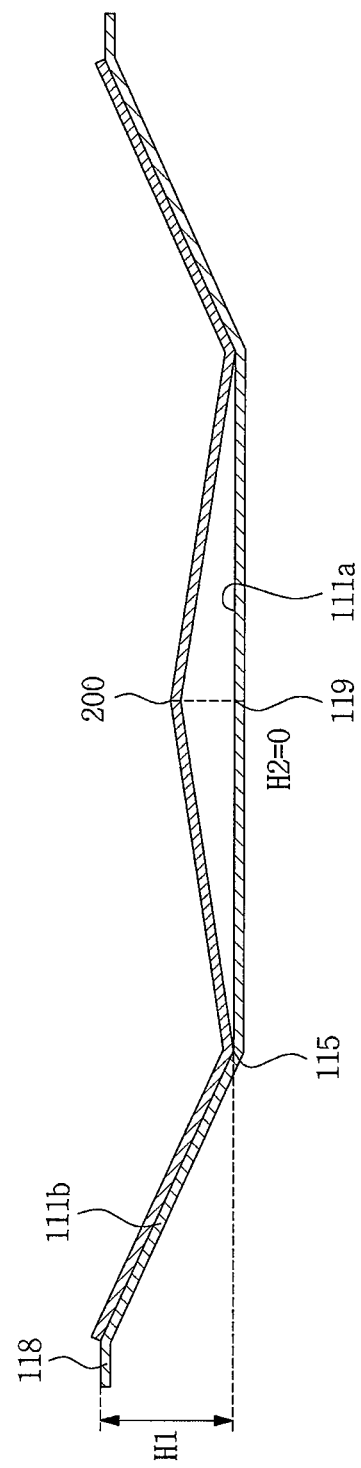
FIGS. 4A to 4C are diagrams illustrating a bottom chassis and a reflector illustrated in FIG. 2.
Figure 4B:
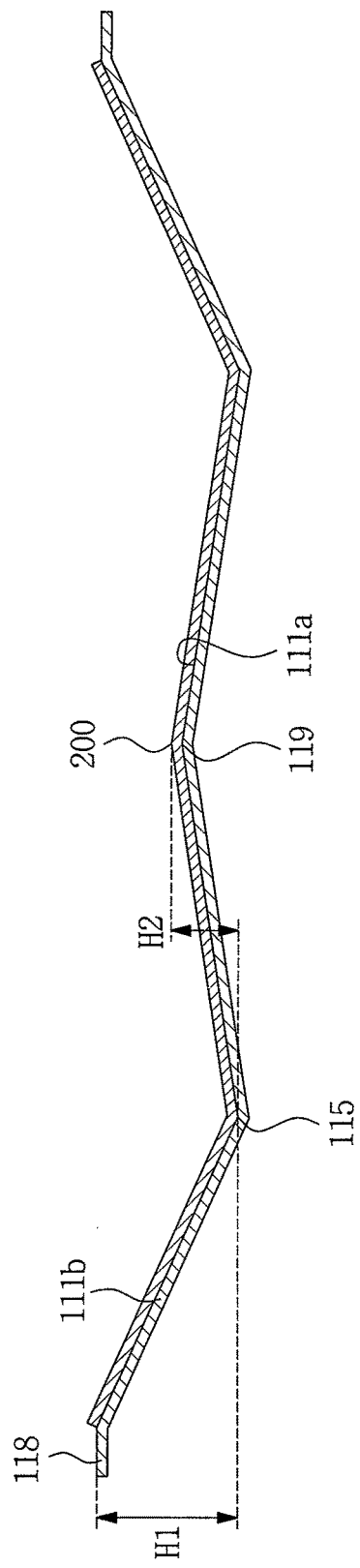
Figure 4C:
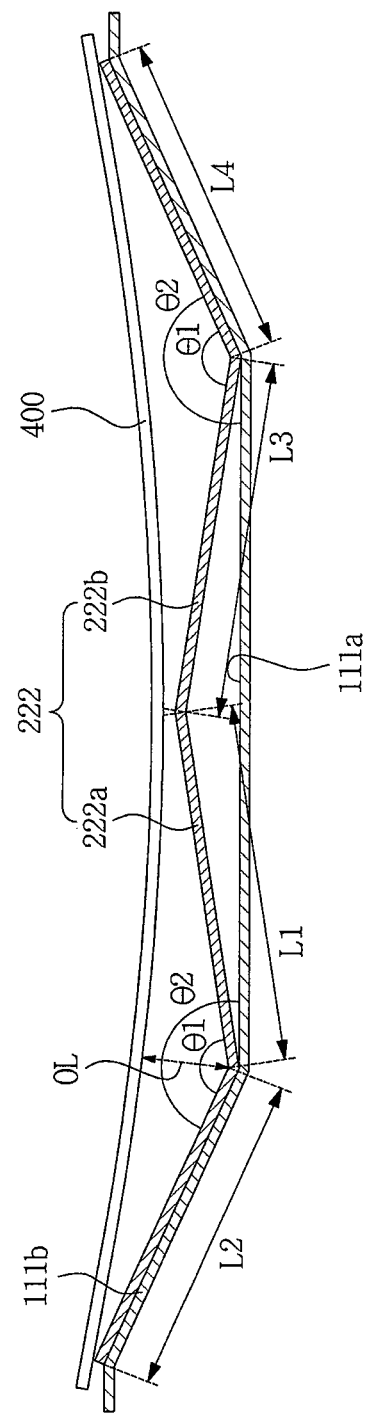

FIGS. 4A to 4C are diagrams illustrating the bottom chassis 100 and the reflector 200 illustrated in FIG. 2.

As illustrated in FIG. 4A, the bottom chassis 100 may include an end portion 118, a bent portion 115, and a central portion 119.

The bent portion 115 may be located in a region where the base portion 111a meets the side portion 111b. The end portion 118 may be located in one side end region of the side portion 111b. The central portion 119 may be located in a middle region of the base portion 111a. In this case, the central portion 119 may correspond to a place where the central support 161 is located.

As illustrated in FIG. 4A, a height H1 between the bent portion 115 and the end portion 118 may be greater than a height H2 between the bent portion 115 and the central portion 119. In this case, H2 may be substantially zero (0).

Additionally, as illustrated in FIG. 4B, the base portion 111a may have the same shape as the inner reflection part 222. In such a case, the height H1 between the bent portion 115 and the end portion 118 may also be greater than the height H2 between the bent portion 115 and the central portion 119.

Additionally, as illustrated in FIG. 4C, an angle between the inner reflection part 222 and outer reflection part 208 of the reflector 200 may be smaller than an angle between the base portion 111a and side portion 111b of the bottom chassis 100. In an exemplary embodiment, as illustrated in FIG. 4C, an angle θ1 between the first reflection part 222a and the outer reflection angle 208 coupled to the first reflection part 222a may be smaller than an angle θ2 between the base portion 111a and the side portion 111b.

A length L1 of the first reflection part 222a, a length L2 of the outer reflection part 208 adjacent to the first reflection part 222a, a length L3 of the second reflection part 222b, and a length L4 of the outer reflection part 208 adjacent to the second reflection part 222b may all be the same. Under such conditions, a line segment OL, which connects a boundary area between the first reflection part 222a and the outer reflection part 208 adjacent thereto to the diffuser 400, and which divides the angle θ1 between the first reflection part 222a and the outer reflection angle 208 coupled thereto in half (into two equal parts), may be greatest in length. That is, the optical path length (or optical distance) may be at maximum.

The diffuser 400 may be located on the reflector 200. The diffuser 400 may allow luminance of light emitted from the light sources 163b to be uniform (e.g., the same) and may transmit the light with uniform luminance to the optical sheet 501.

At least one support 168 may be located under the diffuser 400 so as to support the diffuser 400. The support 168 may be located on the base portion 111a.

The support 168 may be exposed above the reflector 200 through an opening (e.g., a through-hole) 203 of the reflector 200 that is located on the support 168.

The optical sheet 501 may diffuse and collimate light received from the diffuser 400. As illustrated in FIG. 1, the optical sheet 501 may be located between the diffuser 400 and the display panel 700. The optical sheet 501 may include a diffusion sheet 501a, a prism sheet 501b, and a protective sheet 501c. The diffusion sheet 501a, prism sheet 501b and protective sheet 501c may be sequentially ordered so as to be laminated on the diffuser 400 in the order in which they are enumerated.

The diffusion sheet 501a may diffuse light received from the diffuser 400 so as to prevent the light from being partially concentrated.

The prism sheet 501b may be located on the diffusion sheet 501a so as to collimate light diffused from the diffusion sheet 501a in a direction perpendicular to the display panel 700. For this purpose, the prism sheet 501b may have triangular prisms on one surface thereof in a particular arrangement (e.g., a predetermined arrangement).

The protective sheet 501c may be located on the prism sheet 501b so as to protect a surface of the prism sheet 501b and diffuse light to obtain uniformly distributed light. Light passing through the protective sheet 501c may be provided to the display panel 700.

The mold frame 600 may support the display panel 700 and the top chassis 800 while being fixed to the bottom chassis 100 and also may maintain a constant space between the display panel 700 and the optical sheet 501. To perform the above functions, the mold frame 600 may be shaped like a quadrangular frame that includes a first support part 311a and a second support part 311b.

The first support part 311a may support a top chassis 800 portion that covers (e.g., overlaps) the first support part 311a while being placed on the plurality of side portions 111b. An insertion opening (e.g., as insertion hole) 640 may be defined in the first support part 311a, and the locking projection 635 on the side portion 111b may be inserted into the insertion opening 640.

The second support part 311b may extend from an inner edge portion of the first support part 311a toward the space between the optical sheet 501 and the display panel 700. The second support part 311b may be lower in cross-sectional height than the first support part 311a with respect to a common reference point (e.g., the second support part 311b may have a smaller in thickness than the first support part 311a). There may be a space between the top chassis 800 and the second support part 311b because of the height difference between the first and second support parts 311a and 311b, and an edge portion of the display panel 700 may be located in the space.

The display panel 700 may display an image. The display panel 700 may be largely divided into two areas: a display area and a non-display area. The display area may display an image and the non-display area may be installed with signal (conductive) lines that transmit image data required for image display, and control signals and power signals. Further, the non-display area or a driver circuit board may be further installed with some or all of driver circuit units that provide the image data, control signals and power signals.

The display panel 700 may be a liquid crystal display panel, but exemplary embodiments of the present invention are not limited thereto. In addition to the liquid crystal display panel, any suitable panel structure is available if it is capable of displaying an image by receiving light from a backlight unit.

The top chassis 800 may be shaped like a quadrangular frame that covers the non-display area including an edge portion of the front surface of the display panel 700. The top chassis 800 may surround an upper surface and a side surface of the first support part 311a of the mold frame 600 and surround a side surface of a fixing part of the mold frame 600. To perform the above function, the top chassis 800 may include an upper cover 933a configured to cover the upper surface of the first support part 311a and may also include a side cover 933b configured to cover the side surfaces of both the first support part 311a and the fixing part. A hook may be located in an inner side of the side cover 933b, and the hook may be in contact with a lower surface of the fixing part of the mold frame 600. The top chassis 800 may be fixed to the mold frame 600 by the hook.

Figure 5A:
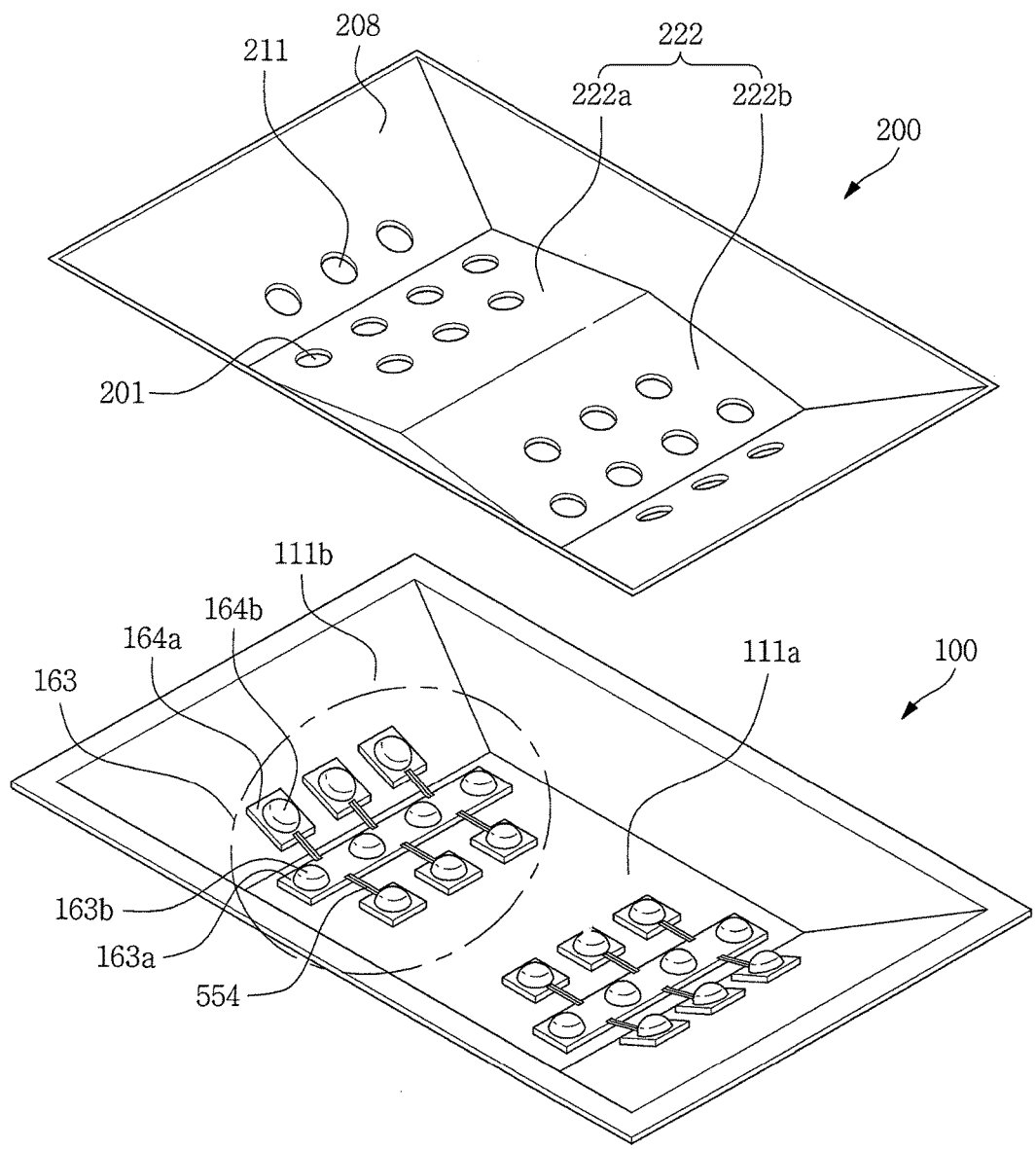
FIGS. 5A and 5B are diagrams illustrating another exemplary embodiment of a light module and a reflector illustrated in FIG. 1.
Figure 5B:
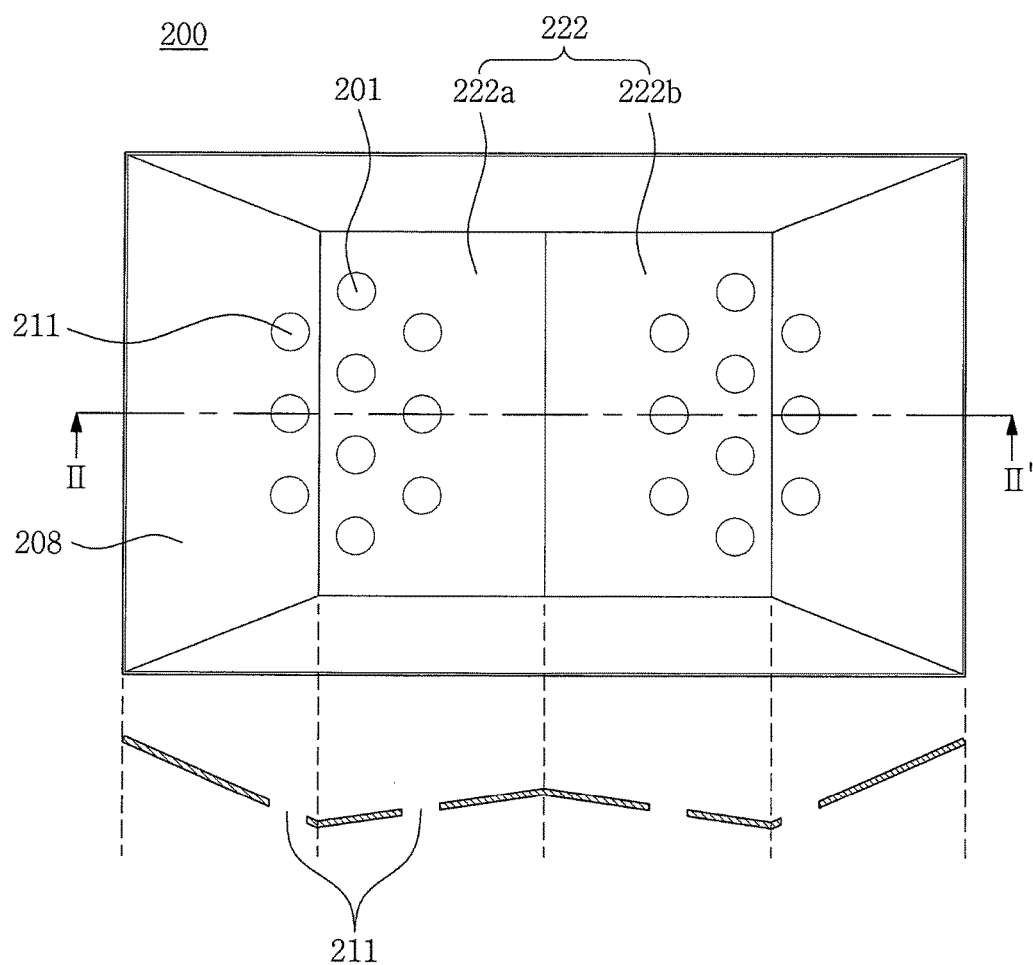

FIGS. 5A and 5B are diagrams illustrating another exemplary embodiment of the light module 163 and the reflector 200 illustrated in FIG. 1. FIG. 5B is a plan view and a cross-sectional view of the reflector 200 illustrated in FIG. 5A, and the cross-sectional view of FIG. 5B is taken along line II-II' of the plan view of the same figure.

As illustrated in FIGS. 5A and 5B, the light module 163 may further include at least one auxiliary PCB 164a and at least one auxiliary light source 164b in addition to the PCB 163a and the plurality of light sources 163b.

The distances between the plurality of light sources 163b mounted on at least one PCB 163a may all be the same or may be different from each other. Further, some of the light sources 163b on one PCB 163a may be spaced only the same distance apart from each other, and the other light sources 163b may be spaced at different distances from each other.

The distances between the plurality of light sources 163b mounted on at least one PCB 163a may all be the same or may be different from each other. Further, some of the light sources 163b may be spaced only the same distance apart from each other, and the other light sources 163b may be spaced at different distances from each other.

The number of light sources 163b located on each PCB 163a may be consistent with each other or may be different from each other. In an exemplary embodiment, the number of light sources 163b located on any one PCB 163a of two PCBs 163a illustrated in FIG. 5A may be greater than the number of light sources 163b located on the other PCB 163a of the two PCBs 163a.

When the number of light sources 163b on each PCB 163a is the same, the light sources 163b, which are located on the different PCBs 163a and correspond to each other, may be located parallel to a length direction of a long side portion.

The auxiliary PCB 164a may be located between the bottom chassis 100 and the reflector 200 and may be electrically coupled to (e.g., electrically connected to) the PCB 163a. For this purpose, the PCB 163a and the auxiliary PCB 164a may be electrically coupled to each other through a flexible printed circuit 554.

The auxiliary light source 164b may be electrically coupled to the auxiliary PCB 164a and may be at least partially exposed above the reflector 200 through at least one auxiliary opening (e.g., one auxiliary through-hole) 211 that penetrates the reflector 200.

As illustrated in FIG. 5A, the auxiliary PCB 164a may be located on an interior surface of a pair of side portions 111b that oppose (e.g., face) each other and on a part of the base portion 111a. In this case, the auxiliary light sources 164b on the auxiliary PCB 164a on the side portion 111b may oppose (e.g., face) the auxiliary light sources 164b on the auxiliary PCB 164a on a part of the base portion 111a with the PCB 163a interposed therebetween. When there is an imaginary line that connects a pair of auxiliary light sources 164b to each other that oppose (e.g., face) each other with the PCB 163a interposed therebetween, the imaginary line may pass between two adjacent light sources 163b on one PCB 163a.

The number of auxiliary light sources 164b on each auxiliary PCB 164a may all be the same or may be different from each other. In an exemplary embodiment, the number of auxiliary light sources 164b located on at least one auxiliary PCB 164a of all auxiliary PCBs 164a illustrated in FIG. 5A may be greater or smaller than the number of auxiliary light sources 164b located on the other auxiliary PCBs 164a.

When the number of auxiliary light sources 164b on each auxiliary PCB 164a is the same, the auxiliary light sources 164b, which are located on the different auxiliary PCBs 164a and correspond to each other, may be located parallel to a length direction of a long or short side portion.

Configurations of the auxiliary PCB 164a and auxiliary light source 164b are substantially similar to (e.g., identical to) those of the PCB 163a and light source 163b illustrated in FIGS. 1 to 3, and thus reference to FIGS. 1 to 3 will make descriptions of the auxiliary PCB 164a and auxiliary light source 164b clearer.

The reflector 200 illustrated in FIGS. 5A and 5B is substantially similar to (e.g., identical to) the reflector 200 illustrated in FIGS. 1 to 3. However, the reflector 200 illustrated in FIGS. 5A and 5B may have more openings (e.g., through-holes) 201 and 211 than the reflector 200 illustrated in FIGS. 1 to 3. This is because more light sources 163b and 164b are located on the bottom chassis 100 illustrated in FIG. 5A compared to FIG. 1.

Additionally, the at least one light diffusion unit 188, at least one central support 161, and at least one support 168 may be further located in the bottom chassis 100 shown in FIG. 5A.

Figure 6A:
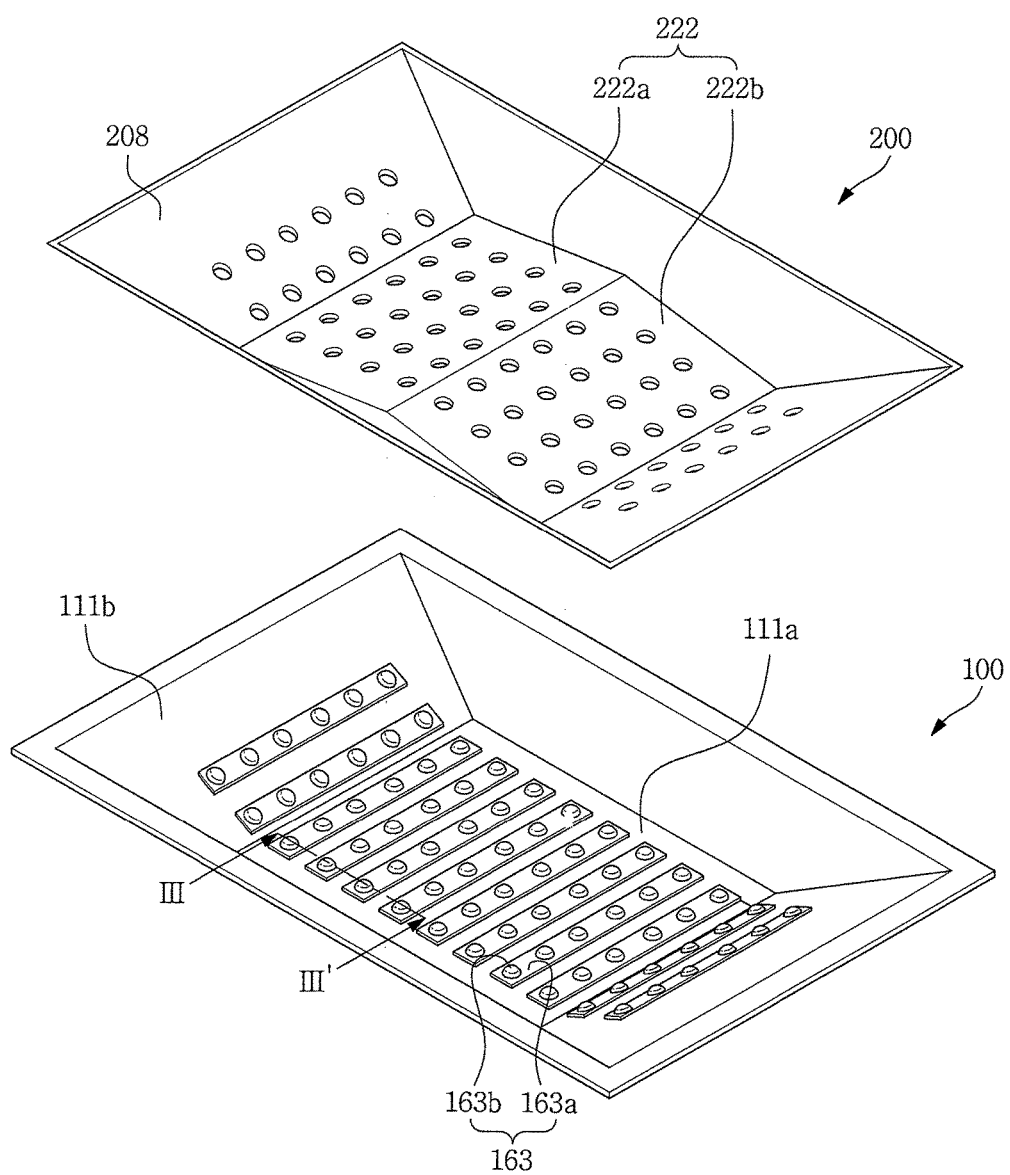
FIGS. 6A and 6B are diagrams illustrating yet another exemplary embodiment of a light module and a reflector illustrated in FIG. 1.
Figure 6B:
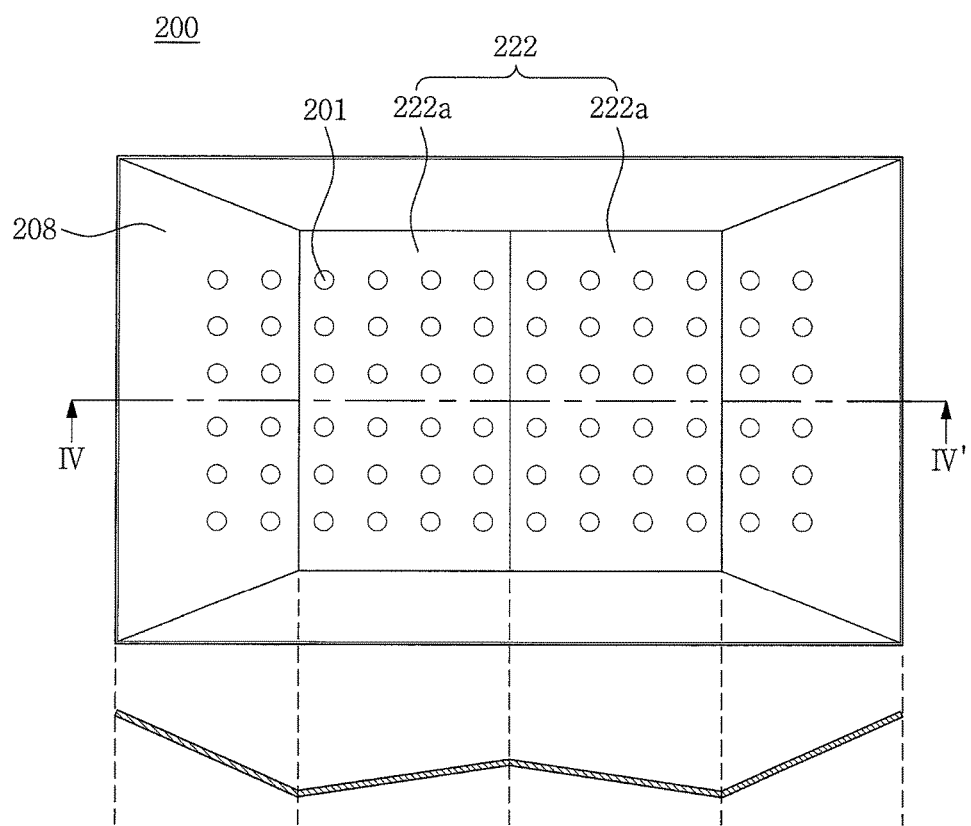

FIGS. 6A and 6B are diagrams illustrating yet another exemplary embodiment of the light module 163 and the reflector 200 illustrated in FIG. 1. FIG. 6B is a plan view and a cross-sectional view of the reflector 200 illustrated in FIG. 6A, and the cross-sectional view of FIG. 6B is taken along line IV-IV' of the plan view of the same figure.

As illustrated in FIGS. 6A and 6B, a plurality of light modules 163 may be evenly spaced on the base portion 111a and on the interior surface of a pair of side portions 111b that oppose (e.g., face) each other. In this case, distances between the plurality of light modules 163 may all be the same or may be different from each other. Further, only some of the light modules 163 may be spaced the same distance apart from each other, and the other light modules 163 may be spaced at different distances from each other.

When the light source 163b may be provided in plural on each PCB 163a, a plurality of light sources 163b mounted on at least one PCB 163a may be aligned with each other along a longitudinal direction of any one side portion 111b. For example, as illustrated in FIG. 6A, the plurality of light sources 163b may be aligned with each other along a longitudinal direction of a short side portion 111b.

Distances between the plurality of light sources 163b on at least one PCB 163a may all be the same or may not be the same. Further, only some of the light sources 163b on one PCB 163a may be spaced the same distance apart from each other and the other light sources 163b may be spaced at different distances from each other.

Distances between a plurality of light sources 163b on at least one PCB 163a may all be the same or may not be the same. Further, only some of the light sources 163b may be spaced the same distance apart from each other, and the other light sources 163b may be spaced at different distances from each other.

The number of light sources 163b on each PCB 163a may be all the same or may be different from each other. In an exemplary embodiment, the number of light sources 163b located on at least one PCB 163a of all PCBs 163a illustrated in FIG. 6A may be greater or smaller than the number of light sources 163b located on the other PCBs 163a.

When the number of light sources 163b on each PCB 163a is the same, the light sources 163b, which are located on the different PCBs 163a and correspond to each other, may be located parallel to a length direction of a long side portion.

A configuration of the light module 163 illustrated in FIG. 6A is substantially similar to (e.g., identical to) that of the light module 163 illustrated in FIGS. 1 to 3, and thus reference to FIGS. 1 to 3 will make descriptions of the light module 163 illustrated in FIG. 6A clearer.

The reflector 200 illustrated in FIGS. 6A and 6B is substantially similar to (e.g., identical to) the reflector 200 illustrated in FIGS. 1 to 3. However, the reflector 200 illustrated in FIGS. 6A and 6B may have more openings (e.g., through-holes) 201 than the reflector 200 illustrated in FIGS. 1 to 3. This is because more light sources 163b are located on the bottom chassis 100 illustrated in FIG. 6A compared to FIG. 1.

Additionally, the at least one light diffusion unit 188, at least one central support 161, and at least one support 168 may be further located in the bottom chassis 100 shown in FIG. 6A.

Figure 7:
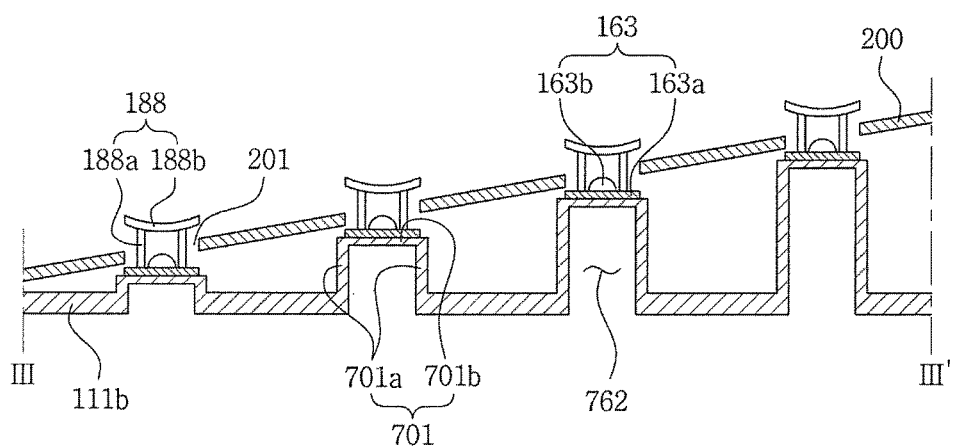
FIG. 7 is a cross-sectional view taken along line III-III' of FIG. 6A.

FIG. 7 is a cross-sectional view taken along line III-Ill' of FIG. 6A.

As illustrated in FIG. 7, as the light module 163 is located closer to a central portion of the base portion 111a, a height difference between the light module 163 and the base portion 111a of the bottom chassis 100 may be larger. This is because the base portion 111a of the bottom chassis 100 is in a horizontal state, whereas the first and second reflection parts 222a and 222b are inclined surfaces that become gradually higher toward a central portion of the inner reflection part 222.

In order to change the height of the light module 163, a plurality of support units 701 having different heights may be located on the base portion 111a as illustrated in FIG. 7. In more detail, the plurality of support units 701 may be located between the base portion 111a and the inner reflection part 222.

As the support unit 701 is located closer to the central portion of the base portion 111a, it may have a greater height.

As illustrated in FIG. 7, the support unit 701 may have a structure that includes two legs 701a that oppose (e.g., face or are parallel with) each other and a mounting plate 701b supported by the two legs 701a. The PCB 163a may be located on the mounting plate 701b.

The legs 701a of each support unit 701 may have different lengths. In more detail, as the support unit 701 is located closer to the central portion of the base portion 111a, the legs 701a of the support unit 701 may have a larger length.

The support unit 701 may be empty inside. For this purpose, there may be a space between the two legs 701a attached to one mounting plate 701b. Further, an opening 762 may be defined in a base portion 111a region that faces the mounting plate 701b and may penetrate the base portion 111a region. Therefore, the space between the two legs 701a may be exposed outwards, and further external air may flow into the space. The structure of the support unit 701 may allow the bottom chassis 100 to have a larger contact area with external air, and accordingly an additional effect of improved heat dissipation performance (e.g., increased heat dissipation) may be achieved.

Additionally, as illustrated in FIG. 7, the support unit 701 may be integrated with the bottom chassis 100. In other words, when the bottom chassis 100 is initially formed, it may be fabricated to include a shape of the support unit 701 illustrated in FIG. 7. When the bottom chassis 100 is integrated with the support unit 701, hardness of the bottom chassis 100 may increase desirably.

Figure 8A:
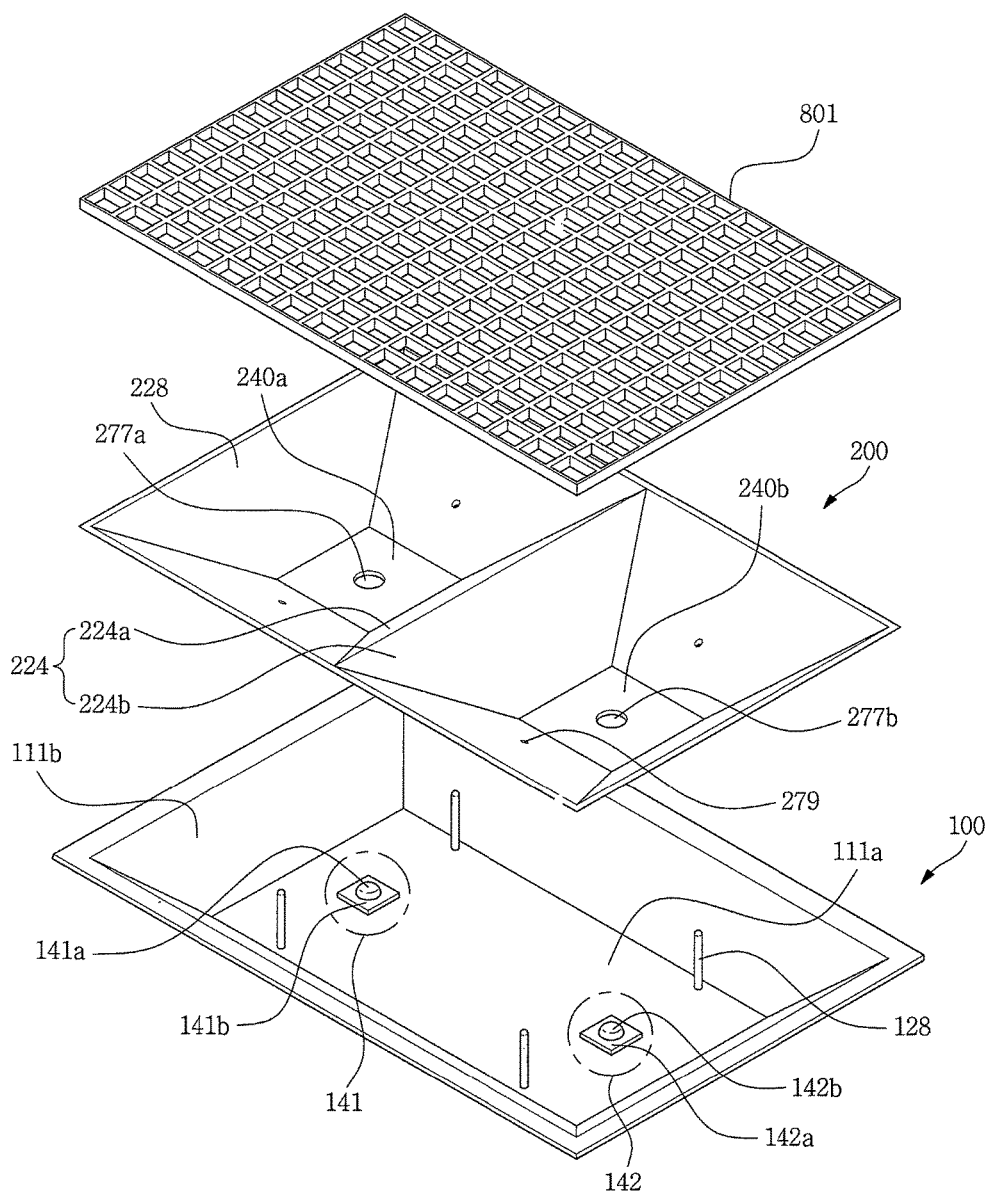
FIGS. 8A and 8B are diagrams illustrating yet another exemplary embodiment of a light module and a reflector illustrated in FIG. 1.
Figure 8B:
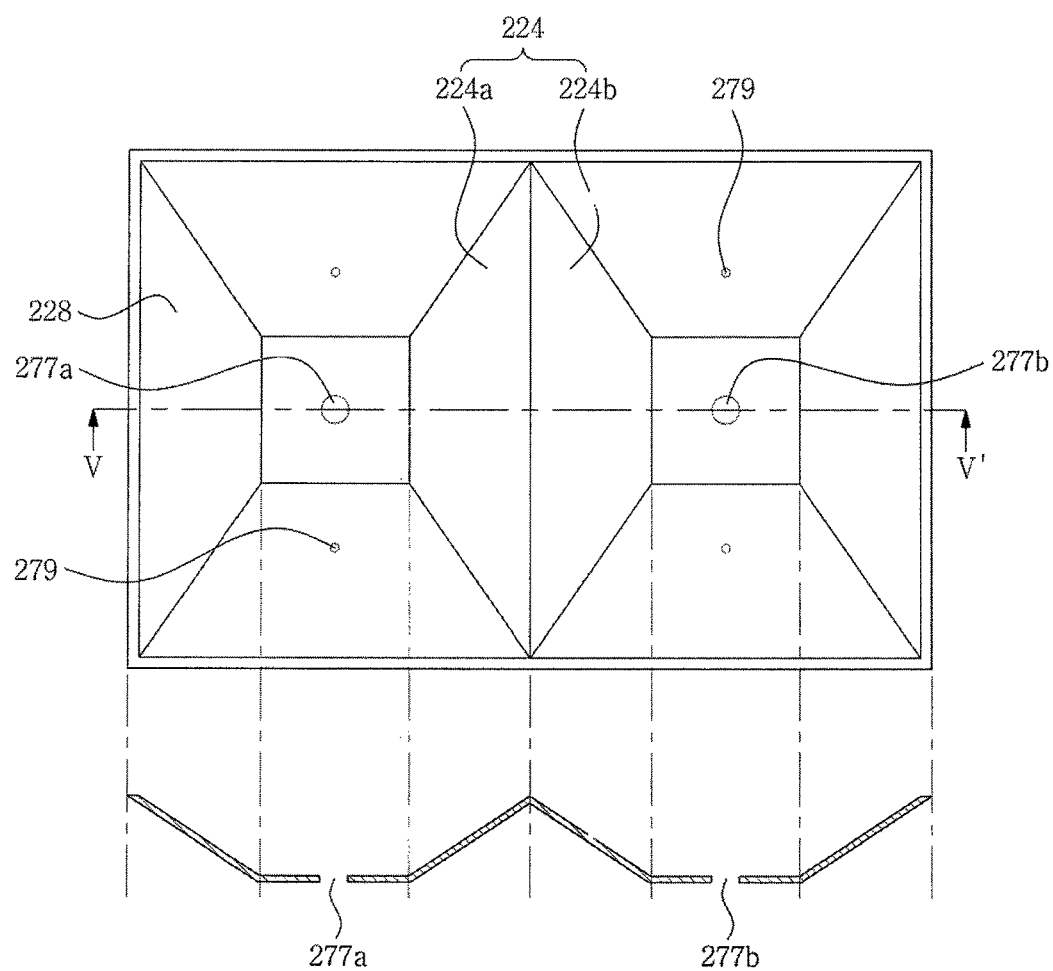

FIGS. 8A and 8B are diagrams illustrating yet another exemplary embodiment of the light module 163 and the reflector 200 illustrated in FIG. 1. FIG. 8B is a plan view and a cross-sectional view of the reflector 200 illustrated in FIG.

8A, and the cross-sectional view of FIG. 8B is taken along line V-V' of the plan view of the same figure.

As illustrated in FIG. 8A, the reflector 200 may include an inner reflection part 224, an outer reflection part 228, a first flat reflection part 240*a*, and a second flat reflection part 240*b*.

The inner reflection part 224 may be located on a central portion of the base portion 111*a*.

The inner reflection part 224 may include two inclined surfaces 224*a* and 224*b*. That is, the two inclined surfaces 224*a* and 224*b* may include a first reflection part 224*a* between a central portion of the base portion 111*a* and a first light module 141, and also include a second reflection part 224*b* between the central portion of the base portion 111*a* and a second light module 142.

The first and second reflection parts 224*a* and 224*b* may be inclined surfaces that gradually extend from a central portion of the inner reflection part 224 toward the lower corresponding light module. That is, the first and second reflection parts 224*a* and 224*b* may be inclined at an angle (e.g., a predetermined angle) with respect to the base portion 111*a*. The base portion 111*a* may form an acute angle with the first reflection part 224*a* and may also form an acute angle with the second reflection part 224*b*.

The outer reflection part 228 may be located on the side portions 111*b*. In more detail, the outer reflection part 228 may be located on an interior surface of each side portion 111*b*. In this case, the interior surface of the side portion 111*b* may be one that faces a surface of another side portion 111*b* or the inner reflection part 224, among a plurality of surfaces of the side portion 111*b*. Interior surfaces of each side portion 111*b* may be inclined at an angle (e.g., a predetermined angle) with respect to the base portion 111*a*. The base portion 111*a* may form an obtuse angle with each side portion 111*b*.

The first flat reflection part 240*a* may be located on the base portion 111*a* that is surrounded by the first reflection part 224*a* and the three outer reflection parts 228.

The second flat reflection part 240*b* may be located on the base portion 111*a* that is surrounded by the second reflection part 224*b* and the three outer reflection parts 228.

In the case of the structure illustrated in FIGS. 8A and 8B, a flat lens 801 having a plurality of openings (e.g., holes) may be located between the reflector 200 and the diffuser 400.

The flat lens 801 may diffuse light emitted from the first and second light modules 141 and 142 so as to provide the display panel 700 with the light.

The flat lens 801 may be supported by a plurality of supports 128.

The supports 128 may be exposed above the reflector 200 through an opening (e.g., a through-hole) 279 defined in the reflector 200.

Configurations of the first and second light modules 141 and 142 illustrated in FIG. 8A are substantially similar to (e.g., identical to) the configuration of the light module 163 illustrated in FIGS. 1 to 3, and thus reference to FIGS. 1 to 3 will make descriptions of the light module 163 illustrated in FIG. 8A clearer.

From the foregoing, it will be appreciated that various exemplary embodiments of the present invention have been described herein for purposes of illustration, and that various suitable modifications may be made without departing from the scope and spirit of the disclosure. Accordingly, the various exemplary embodiments disclosed herein are not intended to limit the scope of the present invention, and the true scope and spirit of the present invention is indicated by the following claims, and equivalents thereof.

What is claimed is:

1. A display device comprising:
    a bottom chassis comprising a bent portion;
    a light module comprising a light source on the bent portion;
    a curved display panel on the bottom chassis and on the light module; and
    a reflector between the curved display panel and the bottom chassis,
    wherein a height between an end portion of the bottom chassis and the bent portion is greater than a height between a central portion of the bottom chassis and the bent portion,
    wherein the reflector comprises an inclined surface having a height, relative to the bottom chassis, that increases toward a central portion of the reflector,
    wherein the bottom chassis comprises:
        a bottom part on which the light module is located; and
        a side part on an edge portion of the bottom part,
    wherein the light module is located on an edge portion of the bottom part, and
    wherein the bottom part forms an obtuse angle with the side part.

2. The display device of claim 1, wherein the reflector and the bottom chassis are spaced from each other in a central portion of the curved display panel.

3. The display device of claim 1, wherein the light module comprises:
    a printed circuit board between the bottom chassis and the reflector, the printed circuit board corresponding to an edge portion of the bottom part; and
    the light source electrically coupled to the printed circuit board, the light source being at least partially exposed above the reflector through an opening penetrating the reflector.

4. The display device of claim 3, further comprising a light diffusion unit configured to diffuse light from the light source.

5. The display device of claim 4, wherein the light diffusion unit comprises:
    a lens on the light source; and
    a lens support configured to support the lens.

6. The display device of claim 5, wherein the lens support is between the lens and the printed circuit board.

7. A display device comprising:
    a bottom chassis comprising a bent portion;
    a light module comprising a light source on the bent portion;
    a curved display panel on the bottom chassis and on the light module; and
    a reflector between the curved display panel and the bottom chassis,
    wherein a height between a end portion of the bottom chassis and the bent portion is greater than a height between a central portion of the bottom chassis and the bent portion,
    wherein the bottom chassis comprises:
        a bottom part on which the light module is located; and
        a side part on an edge portion of the bottom part, and
    wherein the light module is located on an edge portion of the bottom part, and comprises:
        a printed circuit board between the bottom chassis and the reflector, the printed circuit board corresponding to an edge portion of the bottom part;

the light source electrically coupled to the printed circuit board, the light source being at least partially exposed above the reflector through an opening penetrating the reflector;

an auxiliary printed circuit board between the bottom chassis and the reflector, the auxiliary printed circuit board being electrically coupled to the printed circuit board; and an auxiliary light source electrically coupled to the auxiliary printed circuit board, the auxiliary light source being at least partially exposed above the reflector through an auxiliary opening penetrating the reflector.

8. The display device of claim 1, wherein the reflector comprises:

an inner reflection part on the bottom part; and an outer reflection part on the side part.

9. The display device of claim 8, wherein an angle between the inner reflection part and the outer reflection part is smaller than the angle between the bottom part and the side part.

10. The display device of claim 8, wherein the inner reflection part comprises the inclined surface, wherein the inclined surface has a shape of being gradually lower from a central portion of the inner reflection part.

11. The display device of claim 10, wherein the outer reflection part has a same length as the inclined surface.

12. The display device of claim 1, wherein the reflector comprises:

an inner reflection part on a central portion of the bottom part;

an outer reflection part on the side part; and a flat reflection part on the bottom part, the flat reflection part being surrounded by the inner and outer reflection parts.

13. The display device of claim 12, wherein the light module comprises:

a printed circuit board between the bottom chassis and the reflector, the printed circuit board corresponding to the flat reflection part; and the light source electrically coupled to the printed circuit board, the light source being at least partially exposed above the reflector through an opening penetrating the reflector.

14. The display device of claim 13, further comprising a flat lens between the reflector and the curved display panel.

15. The display device of claim 1, further comprising a support between the bottom part and the light module.

16. The display device of claim 15, wherein a plurality of supports have different heights from each other.

17. The display device of claim 15, wherein the support and the bottom part are integrally formed and the support is hollow.

* * * * *